Jan. 29, 1929.　　　　　O. F. IMMELL　　　　1,700,370
LEFT TURN AND STOP SIGNAL
Filed Jan. 16, 1928　　　2 Sheets-Sheet 1

Omer F. Immell
Inventor

Jan. 29, 1929.  O. F. IMMELL  1,700,370

LEFT TURN AND STOP SIGNAL

Filed Jan. 16, 1928  2 Sheets-Sheet 2

Omer F. Immell
Inventor
By C. A. Snow & Co.
Attorneys.

Patented Jan. 29, 1929.

1,700,370

UNITED STATES PATENT OFFICE.

OMER F. IMMELL, OF BLAIR, WISCONSIN.

LEFT-TURN AND STOP SIGNAL.

Application filed January 16, 1928. Serial No. 247,099.

This invention aims to provide a signal adapted to be mounted on an automobile, and to be operated by the driver of the automobile, to indicate the intensions of the driver relative to stopping, turning, and the like. The invention aims to provide a device of the class described, which will be simple in construction, inexpensive to manufacture, and not likely to get out of order.
It is within the province of the disclosure to improve generally and to enhance the utility of devices of that type to which the invention appertains.

With the above and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed. without departing from the spirit of the invention.

Figure 1:
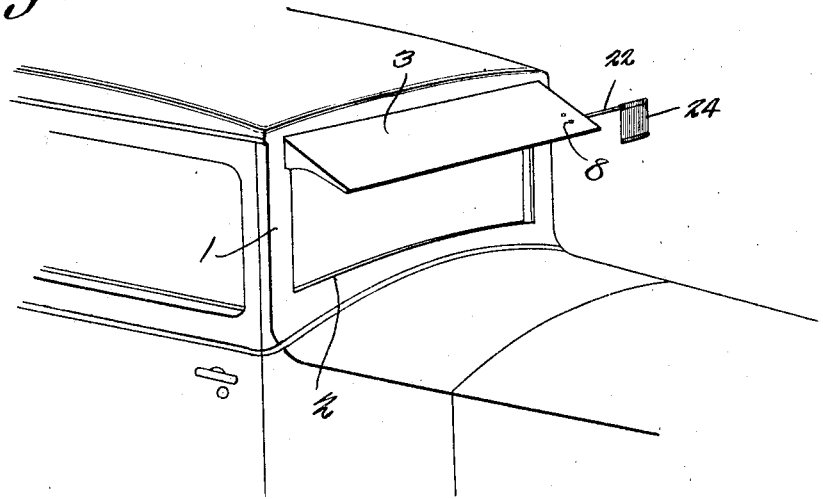
Figure 2:
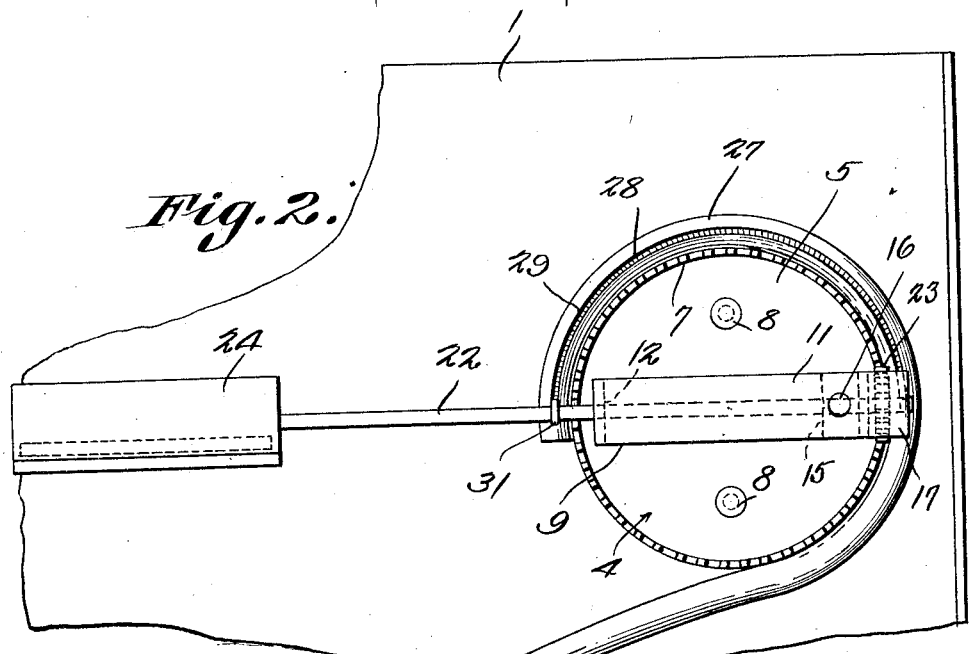
Figure 2:
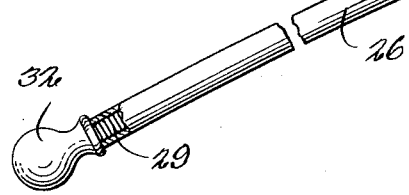
Figure 3:
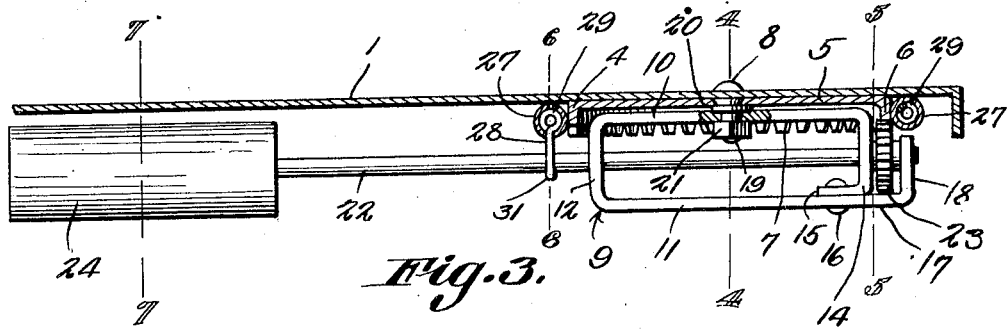
Figure 4:
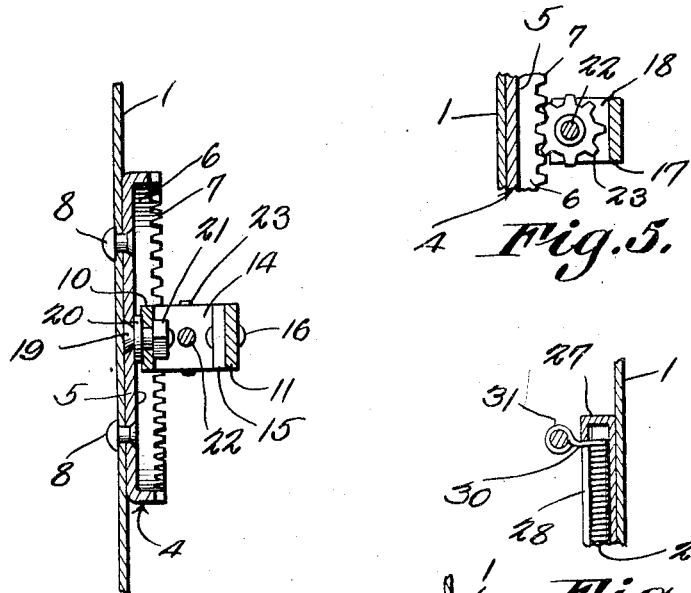
Figure 5:
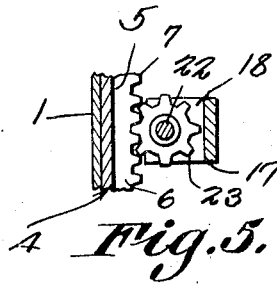
Figure 6:
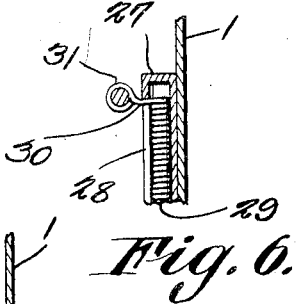
Figure 7:
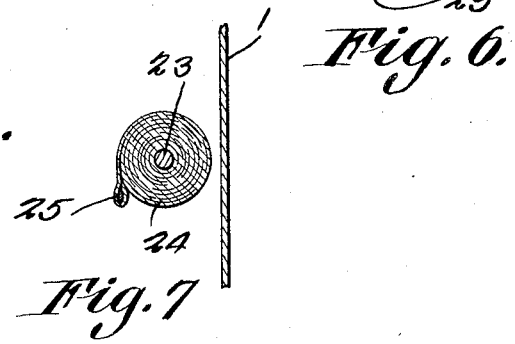

In the drawings:—
Figure 1 shows in perspective, an automobile whereon the device forming the subject matter of this application has been mounted;

Figure 2 is an elevation showing the device mounted on the automobile, parts being broken away;

Figure 3 is a horizontal longitudinal section of the device, parts being in elevation; and Figures 4, 5, 6 and 7 are sections taken on the lines 4—4, 5—5, 6—6 and 7—7 of Figure 3.

The numeral 1 marks a support, which may be the front of an automobile, the forward window being designated by the numeral 2 and being overhung by a shade 3.
A cup-shaped gear member 4 is supplied and includes a base 5 and a rim 6 outstanding from the base, the rim being provided with teeth 7. By means of securing elements 8, the base 5 of the gear member 4 is secured against the support 1 beneath the shade 3.

A loop-shaped frame 9 is supplied and includes sides 10 and 11, and ends 12 and 14, the frame as a whole, being marked by the numeral 9. The frame 9 is fashioned from a single piece of metal, and the end 14 has a tongue 15 overlapped on the side 11 and attached thereto by a securing member 16. The side 11 is prolonged to form an angle bracket 17 including an arm 18 located parallel to the end 14. A stub shaft 19 is mounted on the base 5 of the gear member 4 and is provided with a collar 20 and a head 21. The side 10 of the frame 9 is mounted to swing on the stub shaft 19 between the collar 20 and the head 21, the collar 20 serving to space the side 11 of the frame 9 from the base 5 of the gear member 4, when the frame 9 turns on the shaft 19.

A shaft 22 is provided and is journaled for rotation in the end 12, the end 14, and the arm 18 of the frame 9. A pinion 23 is secured to the shaft 22 and is located between the arm 18 and the end member 14 of the frame 9, the pinion 23 meshing with the gear member 4. On the outer end of the shaft 22 is a signal, of any desired kind. In the present embodiment of the invention, the signal consists of a flexible flag 24 secured at its inner end to the shaft 22, the flag being wound about the shaft 22 and being provided at its free end with a weight 25 which prevents the flag from flop-ping about to an undesirable extent, when the shaft 22 is in the outstanding horizontal position of Figure 1, and when the flag 24 is unrolled.

The numeral 26 designates a guide tube which is extended to any accessible place on the vehicle. The guide tube 26 includes a curved portion 27 extended around the rim 6 of the gear member 4 and secured either to the rim of the gear member, or to the support 1, but, preferably, to the rim of the gear member. A slot 28 of about 180° extent is formed in the curved portion 27 of the guide tube 26.

A flexible operating member 29 is mounted for longitudinal reciprocation in the guide tube 26. Although the operating member 29 is flexible, it is preferably longitudinally inextensible, and incompressible, so that it maintains a fixed length under push and pull. At one end, the operating member 29 has a handle 32 of any desired construction, located within easy reach of the driver of the vehicle. At its opposite end, the operating member 29 has a laterally extended finger 30, mounted to slide in the slot 28 of the guide tube, the finger 30 terminating in an eye 31 in which the shaft 22 is journaled, the operating member 29 being connected to the shaft, through the instrumentality of the aforesaid eye.

In practical operation, longitudinal movement may be imparted to the flexible operating member 29 by means of the handle 32, and by way of the eye 31, a swinging movement will be imparted to the shaft 22. When the shaft 22 is swung, the frame 9 is caused to turn on the stub shaft 19, and when the frame 9 turns as aforesaid, the pinion 23 is caused to move in an orbit, the center of which is the shaft 19. As the pinion 23 thus is carried around in an orbit, rotation is imparted to the pinion, because the pinion is in mesh with the teeth 7 of the fixed gear member 4, and rotation, thus is imparted to the shaft 22. When the shaft is swung outwardly into the position shown in Figure 1 of the drawings, the flag 24 is unrolled, and when the shaft 22 is swung back to a vertical position, the flag 24 is rolled up as shown for instance, in Figure 7 of the drawings.

What is claimed is:—

1. In a device of the class described, a fixed gear member, a frame supported for swinging movement, a shaft journaled in the frame, a flexible flag connected to the shaft and adapted to be wound thereon when rotation is imparted to the shaft, a pinion on the shaft and meshing with the gear member, and means for swinging the frame, thereby to cause the gear to rotate the pinion and the shaft.

2. In a device of the class described, a fixed gear member, a frame supported for swinging movement, a shaft journaled in the frame, a signal carried by the shaft, a pinion on the shaft and meshing with the gear member, an arcuate guide extended circumferentially of the gear member, a flexible operating member mounted for longitudinal sliding movement in the guide, and means carried by the operating member for imparting swinging movement to the frame.

3. In a device of the class described, a fixed gear member, a frame supported for swinging movement, a shaft journaled in the frame, a signal carried by the shaft, a pinion on the shaft and meshing with the gear member, an arcuate guide extended circumferentially of the gear member and provided with an arcuate slot, a flexible operating member mounted for longitudinal sliding movement in the guide, and a finger on the operating member and extending outwardly through the slot, the finger receiving the shaft for rotation and constituting means whereby swinging movement may be imparted to the frame by way of the shaft.

4. In a device of the class described, a base provided with a gear member, a loop shaped frame including sides and ends and an angular bracket spaced from one end of the frame, means for connecting one side of the frame with the base, thereby to support the frame for swinging movement, a shaft journaled for rotation in the ends and in the bracket, a signal carried by the shaft, means for swinging the frame, and a pinion mounted on the shaft between the bracket and the adjacent end of the frame, the pinion meshing with the gear member.

In testimony that I claim the foregoing as my own, I have hereto affixed my signature.

OMER F. IMMELL.